US008228954B2

(12) United States Patent
Thubert et al.

(10) Patent No.: US 8,228,954 B2
(45) Date of Patent: Jul. 24, 2012

(54) ROUTING OPERATIONS USING SENSOR DATA (75) Inventors: Pascal Thubert, La Colle sur Loup (FR); Patrick Wetterwald, Mouans Sartoux (FR); Vincent Jean Ribiere, Biot (FR); Alpesh S. Patel, Pleasanton, CA (US); Jean-Philippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 111 days.

(21) Appl. No.: 11/938,970

(22) Filed: Nov. 13, 2007

(65) Prior Publication Data

US 2009/0122797 A1    May 14, 2009

(51) Int. Cl.
H04J 3/06 (2006.01)
H04L 12/56 (2006.01)
H04L 12/28 (2006.01)
H04W 4/00 (2009.01)

(52) U.S. Cl. ......... 370/503; 370/328; 370/390; 370/408

(58) Field of Classification Search .................. 370/238, 370/393, 389, 313, 219, 252, 338; 340/870.07; 709/232

See application file for complete search history.

(56) References Cited

U.S. PATENT DOCUMENTS

| 6,912,586 | B1 * | 6/2005 | Achtermann et al. ........ 709/232 |
| 7,020,086 | B2 * | 3/2006 | Juttner et al. ................. 370/238 |
| 7,035,240 | B1 | 4/2006 | Balakrishnan et al. |
| 7,151,769 | B2 * | 12/2006 | Stanforth et al. ............. 370/351 |
| 7,200,132 | B2 * | 4/2007 | Twitchell, Jr. ................. 370/338 |
| 7,203,175 | B2 | 4/2007 | Thubert et al. |
| 7,251,570 | B2 * | 7/2007 | Hancock et al. ................ 702/57 |
| 7,430,205 | B2 * | 9/2008 | Ota et al. ...................... 370/393 |
| 7,526,493 | B2 * | 4/2009 | Betts et al. ........................... 1/1 |
| 7,554,996 | B2 * | 6/2009 | Previdi et al. ................. 370/401 |
| 7,558,195 | B1 * | 7/2009 | Kuo et al. ...................... 370/219 |
| 7,768,995 | B2 * | 8/2010 | Yang et al. .................... 370/351 |
| 7,769,848 | B2 * | 8/2010 | Choy et al. .................... 709/224 |
| 7,787,450 | B1 * | 8/2010 | Chan et al. .................... 370/389 |
| 7,941,188 | B2 * | 5/2011 | Jung et al. .................. 455/562.1 |
| 7,986,643 | B2 * | 7/2011 | Thubert et al. ................ 370/256 |
| 2002/0090949 | A1 * | 7/2002 | Stanforth ....................... 455/445 |

(Continued)

FOREIGN PATENT DOCUMENTS

WO    WO 2007038462 A2 *   4/2007

OTHER PUBLICATIONS

Kulik et al. (Adaptive Protocol for Information Dissemination in Wireless Sensor Networks—Aug. 1999).*

(Continued)

Primary Examiner — Marsha D Banks Harold
Assistant Examiner — Christopher Wyllie
(74) Attorney, Agent, or Firm — Leon R. Turkevich (57) ABSTRACT In one embodiment, a method comprises an Internet Protocol (IP) router receiving sensor data from at least one of a second IP router or an attached host sensor node, the sensor data distinct from link data of a network link; the IP router generating sensor information based on storing the sensor data with metadata describing reception of the sensor data by the IP router in a routing information base; and the IP router executing a routing operation based on the sensor information stored in the routing information base.

16 Claims, 4 Drawing Sheets

U.S. PATENT DOCUMENTS

| | | | |
|---|---|---|---|
| 2003/0026268 A1* | 2/2003 | Navas | 370/400 |
| 2004/0039840 A1* | 2/2004 | Dispensa et al. | 709/242 |
| 2004/0134336 A1 | 7/2004 | Solomon | |
| 2005/0041598 A1* | 2/2005 | Cho et al. | 370/252 |
| 2005/0076054 A1* | 4/2005 | Moon et al. | 707/103 Y |
| 2005/0157698 A1* | 7/2005 | Park et al. | 370/351 |
| 2005/0226201 A1* | 10/2005 | McMillin | 370/348 |
| 2005/0265259 A1* | 12/2005 | Thubert et al. | 370/255 |
| 2006/0133363 A1* | 6/2006 | Dumet et al. | 370/389 |
| 2006/0215698 A1* | 9/2006 | Hamdan | 370/471 |
| 2006/0227724 A1* | 10/2006 | Thubert et al. | 370/254 |
| 2006/0248197 A1* | 11/2006 | Evans et al. | 709/227 |
| 2006/0291404 A1 | 12/2006 | Thubert et al. | |
| 2007/0088225 A1* | 4/2007 | Tanaka et al. | 600/503 |
| 2007/0127459 A1* | 6/2007 | Lo et al. | 370/389 |
| 2007/0140303 A1* | 6/2007 | Kim et al. | 370/503 |
| 2007/0153707 A1* | 7/2007 | Thubert et al. | 370/254 |
| 2007/0198675 A1* | 8/2007 | Amanuddin et al. | 709/223 |
| 2008/0031236 A1* | 2/2008 | Yang et al. | 370/389 |
| 2008/0080401 A1* | 4/2008 | Ribiere et al. | 370/256 |
| 2008/0094205 A1* | 4/2008 | Thorn | 340/539.1 |
| 2008/0168440 A1* | 7/2008 | Regnier et al. | 718/100 |
| 2008/0259919 A1* | 10/2008 | Monga | 370/389 |
| 2009/0016215 A1 | 1/2009 | Nadas et al. | |
| 2009/0080370 A1* | 3/2009 | Patel et al. | 370/328 |
| 2009/0085769 A1* | 4/2009 | Thubert et al. | 340/870.07 |
| 2009/0122797 A1* | 5/2009 | Thubert et al. | 370/392 |
| 2010/0125437 A1* | 5/2010 | Vasseur et al. | 702/188 |
| 2010/0125584 A1* | 5/2010 | Navas | 707/747 |
| 2011/0228696 A1* | 9/2011 | Agarwal et al. | 370/253 |
| 2012/0039186 A1* | 2/2012 | Vasseur | 370/248 |
| 2012/0063436 A1* | 3/2012 | Thubert et al. | 370/338 |

OTHER PUBLICATIONS

Kulik et al. Adaptive Protocols for Information Dissemination in Wireless Sensor Network Aug. 1999.*
U.S. Appl. No. 11/862,845, filed Sep. 27, 2007, Thubert et al.
U.S. Appl. No. 11/903,998, filed Sep. 24, 2007, Patel et al.
Wikipedia, "6IoWPAN", [online], Aug. 23, 2007 [retrieved on Sep. 19, 2007]. Retrieved from the Internet: <URL: http://en.wikipedia.org/w/index.php?title=6IoWPAN&printable=yes>, pp. 1-3.
Mukhopadhyay et al., "Low-cost, Reliable Data Aggregation Techniques for Wireless Sensor Networks", [online], Aug. 5, 2003 [retrieved on Sep. 19, 2007]. Retrieved from the Internet: <URL: http://esdat.ucsd.edu/projects/relSens/CWC2003_shoubhik.pdf>, pp. 1-5.
Govindan et al, "The Sensor Network as a Database", [online], 2002, [retrieved on Mar. 22, 2007]. Retrieved from the Internet: <URL: http://citeseer.ist.psu.edu/cache/papers/cs/28132/ftp:zSzzSzftp.usc.eduzSzpubzSzcsinfoz Sztech-reportszSzpaperszSz02-771.pdf/govindan02sensor.pdf>, pp. 1-8.
Wikipedia, "IS-IS", [online], Sep. 13, 2007 [retrieved on Sep. 20, 2007]. Retrieved from the Internet: <URL:http://en.wikipedia.org/w/index.php?title=IS-IS&printable=yes>, pp. 1-3.
Heinzelman et al, "Energy-Efficient Communication Protocol for Wireless Microsensor Networks", [online] Proceedings of the Hawaii International Conference on System Sciences, Jan. 4-7, 2000, Maui, Hawaii, IEEE 2000, [retrieved on Aug. 22, 2007]. Retrieved from the Internet: <URL: http://wind.lcs.mit.edu/papers/leach-hicss.ps>, pp. 1-10.
Wikipedia, "Open Shortest Path First", [online], Sep. 20, 2007 [retrieved on Sep. 20, 2007]. Retrieved from the Internet: <URL: http://en.wikipedia.org/w/index.php?title=Open_Shortest_Path_First&printable=yes>, pp. 1-9.
"Routing Protocols for Sensor Networks", [online], [retrieved on Jul. 27, 2007]. Retrieved from the Internet: <http://nms.csail.mit.edu/projects/leach/>, pp. 1-2.
Wikipedia, "Routing Table", [online], Sep. 16, 2007 [retrieved on Sep. 29, 2007]. Retrieved from the Internet: <URL: http://en.wikipedia.org/w/index.php?title=Routing_table&printable=yes>, pp. 1-3.
Heinzelman et al, "Adaptive Protocols for Information Dissemination in Wireless Sensor Networks", [online] Fifth ACM/IEEE MOBICOM Conference, Seattle, WA, Aug. 1999, [retrieved on Aug. 22, 2007]. Retrieved from the Internet: <URL: http://wind.lcs.mit.edu/papers/spin-mobicom99.ps>pp. 1-12.
"Korea's KT Deploys Wireless Mesh Weather Forecasting Network", [online], [retrieved on Aug. 15, 2007]. Retrieved from the Internet: <URL: http://wireless.sensormag.com/sensorswireless/article/articleDetail.jsp?...>, Dec. 2006, pp. 1-3.
Narten et al., "Neighbor Discovery for IP Version 6 (IPv6)", Network Working Group, Request for Comments: 2461, Dec. 1998, pp. 1-93.
Arkko et al., "SEcure Neighbor Discovery (SEND)", Network Working Group, Request for Comments: 3971, Mar. 2005, pp. 1-56.
Popovicu et al., "Deploying IPv6 Networks", Cisco Press, Indianapolis, IN, ISBN 1587052105, Nov. 2006, pp. 308-309.
"Technical Overview of Time Synchronized Mesh Protocol (TSMP)", [online], Jun. 2006, Dust Networks, [retrieved on Aug. 17, 2007]. Retrieved from the Internet: <URL: http://www.dustnetworks.com/docs/TSMP_Whitepaper.pdf>, pp. 1-18.
Yarvis et al., "Real-World Experiences with an Interactive Ad Hoc Sensor Network", Proceedings of the International Conference on Parallel Processing Workshops (ICPPW'02), 2002, IEEE Computer Society, pp. 1-9.

* cited by examiner

ROUTING OPERATIONS USING SENSOR DATA

TECHNICAL FIELD

The present disclosure generally relates to using an Internet Protocol (IP) network for reception and transport of sensor data from sensor host nodes in a sensor network.

BACKGROUND

Sensor networks enable sensor data from remote sensors to be transported within data packets to a destination controller, for example an executable application configured for monitoring the sensor data. The remote sensors (e.g., video cameras, weather sensors, etc.) can be implemented as sensor host nodes configured for forming a layer 2 wireless mesh network, configured for reaching the destination controller, based on relaying or "flooding" sensor data throughout the mesh network (i.e., "gossiping"). Centimeter-sized (or smaller) sensor host nodes, referred to as "sensor dust", have limited battery life and therefore are limited in their ability in relaying data packets from other sensor host nodes throughout the wireless mesh network. Mobile routers also can be deployed to form the mesh network, enabling the sensor host nodes to be implemented for example as wireless IPv6 host nodes. Hence, the mobile routers forming the mesh network can serve as default gateways for the sensor host nodes, enabling transport of the data packets transmitted by the sensor host nodes and carrying the sensor data to the destination controller via the mesh network.

The Internet Engineering Task Force (IETF) also has a working group, entitled "IPv6 over Low power Wireless Personal Area Networks" ("6loWPAN"), investigating IPv6 transport of sensor data from sensor host nodes in a sensor network implemented, for example, using a Personal Area Network (PAN) such as an IEEE 802.15.4 network.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises an Internet Protocol (IP) router receiving sensor data from at least one of a second IP router or an attached host sensor node, the sensor data distinct from link data of a network link; the IP router generating sensor information based on storing the sensor data with metadata describing reception of the sensor data by the IP router in a routing information base; and the IP router executing a routing operation based on the sensor information stored in the routing information base.

In another embodiment, an apparatus comprises an Internet Protocol (IP) network interface circuit, a memory circuit, and a routing circuit. The IP network interface is configured for receiving sensor data from at least one of an IP advertisement message from an IP router or an attached host sensor node, the sensor data distinct from link data of a network link. The memory circuit is configured for storing a routing information base. The routing circuit is configured for generating sensor information based on storing, into the routing information base, the sensor data with metadata describing reception of the sensor data by the apparatus, the routing circuit configured for executing a routing operation based on the sensor information stored in the routing information base.

DETAILED DESCRIPTION

Particular embodiments extend the capabilities of routers configured for relying on existing routing protocols for exchanging metrics that are used in order to compute routes through an autonomous system, for example a wide area network. Such routers can be configured to receive sensor data from a sensor network, store the sensor data within their respective routing information bases (e.g., routing tables), and execute routing operations based on the sensor data stored in the routing information base.

Routing operations can be performed using the sensor data, stored in the routing information base, based on metadata that is generated by the router and that describes attributes of the received sensor data, including attributes describing reception of the sensor data (e.g., identifying the network node having transmitted the sensor data to the router, date and time of reception, identity and/or location of the router having received the sensor data, etc.). Additional attributes can be added to the metadata to more precisely describe the context of the received sensor data, for example an identifier of the source sensor network if multiple sensor networks are implemented, a Personal Area Network (PAN) identifier if one or more personal area networks are implemented for transport of the sensor data, etc. Additional attributes that can be added to the metadata include different indexes that can be used by the router in sorting the sensor data stored in the routing information base. Applying information theory and information science, such attributes provide context and structure to the received sensor data, resulting in "sensor information". Hence, the metadata that describes the context of the received sensor data, including reception of the sensor data by the router, also enables the context of the received sensor data to be structured according to prescribed criteria, such that the metadata applied to the corresponding sensor data can create "sensor information" that can be used for implementing routing operations, described below.

An example routing operation that can be performed by a router includes distributing the sensor information (including the sensor data and the associated metadata, i.e., "information metadata") among other routers according to existing routing protocols or according to a layer 4 distribution protocol. Hence, the distribution of sensor information among the routers based on database synchronization of the respective routing information bases (RIBs) enables the network implemented by the routers to serve as a distributed database for sensor applications that need to access the sensor information. Hence, a sensor application executed on a network node can obtain the sensor information from the nearest router of the network, as opposed to requiring a query from the sensor application to traverse the network in order to reach a specific gateway configured for collecting all of the sensor data within the sensor network.

Another example routing operation that can be performed by a router includes executing constrained routing, where a constrained routing path to a destination is generated such that a first path for reaching the destination is chosen if relevant sensor information identifies a first attribute (e.g., low wind conditions), or a second path for reaching the destination is chosen if the relevant sensor information identifies a second attribute (e.g., high wind conditions). Hence, constrained routing paths can be generated and implemented based on the sensor information generated from the received sensor data. Such constrained routing paths can be used as the basis for establishing a multi-topology routing based on the sensor information.

Distribution of routing information between routers according to a prescribed routing protocol providing synchronization of routing information (e.g., Open Shortest Path First (OSPF), Intermediate System to Intermediate System (IS-IS)) enables each of the routers to generate a graph of the network topology, and perform route computation based on calculating path costs and the network topology in order to generate optimized paths. The prescribed routing protocol (e.g., OSPF, IS-IS) also can be used for distribution of the sensor information among other routers, based on forwarding the sensor data and associated information metadata as data that is opaque to the prescribed routing protocol; hence, the prescribed routing protocol can be used to provide synchronization of the sensor information. Further, each of the routers can be configured for accumulating the sensor information over time, enabling the routers to establish an evolution of the sensor data relative to a prescribed evolution domain (e.g., time or constrained lifetime, geographic distribution, network growth distribution). Hence, each of the routers can be configured for executing statistical or optimization operations relative to different evolution domains, resulting in each router capable of generating "knowledge metadata" that describes the evolution of the sensor information generated by the IP router (and received from other routers via database synchronization), resulting in the formation of "sensor knowledge" that uses the knowledge metadata to provide the interpretation of the relevant sensor information.

Figure 1:
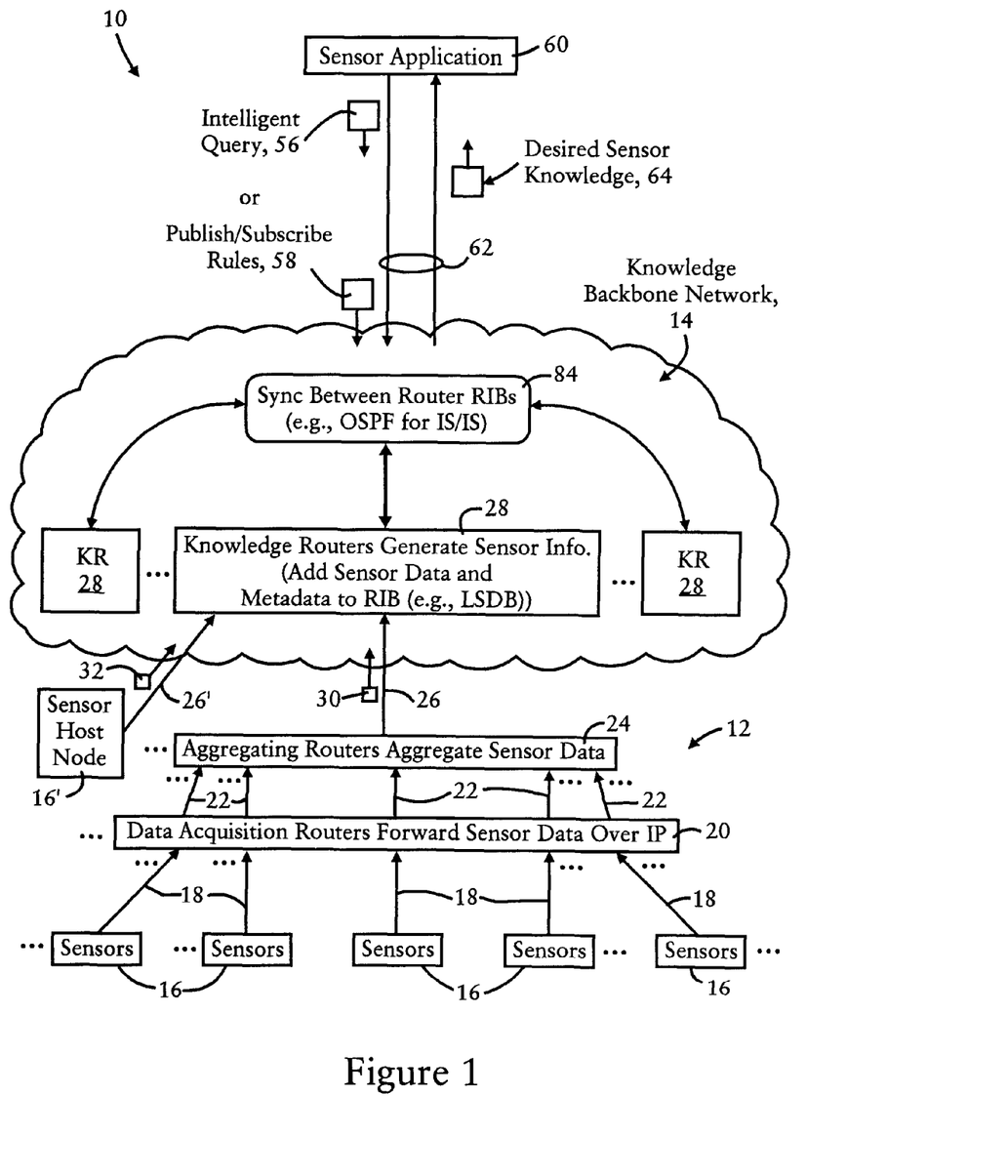
FIG. 1 illustrates an example system having IP-based knowledge routers configured for generating sensor information based on received sensor data, and generating sensor knowledge based on exchanging sensor information with other IP routers, according to an example embodiment.

FIG. 1 is a diagram illustrating an example network 10 having a sensor network 12 and a knowledge backbone network 14 for supplying sensor knowledge 64 to a sensor application 60, according to an example embodiment. The sensor network 12 includes multiple host sensor nodes 16, implemented for example as IPv6 host nodes configured for outputting sensor data via wired or wireless sensor data links 18. The sensor network 12 also can include data acquisition routers 20 configured for receiving the sensor data from these sensors 16 via the sensor data links 18. The sensor data links 18 can be implemented as wireless mobile ad hoc network (MANET) links, although other link layer protocols can be used for the sensor data links 18, for example "6loWPAN" type networks implemented using a Personal Area Network (PAN) over an IEEE 802.15.4 network. These sensors 16 and the associated data links 18 also can be implemented using proprietary link layer protocols, assuming the data acquisition routers 20 include the appropriate link layer interface for receiving the sensor data via the sensor data links 18.

The data acquisition routers 20 can be implemented as mobile ad hoc network (MANET) routers configured for receiving the sensor data via the appropriate link layer protocol utilized by the wireless data links 18. The data acquisition routers 20 also can be configured with multiple distinct link interfaces that enable the data acquisition routers 20 to receive sensor data from different groups of sensors 16 and across respective link layer domains for example different wireless channels, different link layer protocols, different sensor services, etc. The data acquisition routers 20 also can be configured for forwarding the received sensor data via IPv6 packets over IP-based data links 22. Hence, the data acquisition routers 20 can serve as the ingress edge to an IP network, and can inject the sensor data received via the wireless sensor data links 18 into the IP network via IP data links 22, without any modification to the received sensor data.

The sensor network 12 also can include aggregating routers 24 that can be configured for aggregating the received sensor data into aggregated sensor data, and outputting the aggregated sensor data into the knowledge backbone network 14 via an IP data link 26. The aggregating routers 24 can implement a tree topology that enables the sensor data to be aggregated in order to minimize the number of IP data packets that need to be transmitted to the knowledge backbone network 14.

An example of aggregating routers 24 utilizing a tree topology for aggregation of sensor data is described in commonly-assigned, copending U.S. patent application Ser. No. 11/862,845, filed Sep. 27, 2007, entitled "Aggregation and Propagation of Sensor Data Within Neighbor Discovery Messages in a Tree-Based Ad Hoc Network", published Apr. 2, 2009 as U.S. Patent Publication No. 2009/0085769. In summary, this copending application Ser. No. 11/862,845 describes mobile routers that can establish a wireless ad hoc mobile network having a tree-based topology, and that can output neighbor advertisement messages toward the root (i.e., clusterhead) of the tree-based topology. The neighbor advertisement messages can specify aggregated network prefix reachability information, as described in commonly-assigned U.S. Patent Publication No. 2005/0265259, published Dec. 1, 2005, entitled "Arrangement for Providing Network Prefix Information from Attached Mobile Routers to a Clusterhead in a Tree-based Ad Hoc Mobile Network". The neighbor advertisement messages also can specify aggregated sensor data based on an aggregation of received sensor data messages from attached sensor host nodes. If a given mobile router is an intermediate mobile router that serves as a default attachment router for at least one attached mobile router, the intermediate mobile router can generate its aggregated sensor data based on an aggregation of the received sensor data messages from attached sensor host nodes, plus received aggregated sensor data retrieved by the intermediate mobile router from a received neighbor advertisement message.

Hence, the mobile routers described in this copending application Ser. No. 11/862,845 can propagate aggregated sensor data toward the clusterhead using neighbor advertisement messages that are relied upon for propagation of network reachability information within the tree-based ad hoc mobile network. Consequently, wireless network traffic can be dramatically reduced by multiple orders of magnitude based on implementing a tree-based wireless ad hoc mobile network: the tree-based wireless ad hoc mobile network enables each sensor host node to send its sensor data to a single attachment mobile router, eliminating the necessity of relaying data packets from sensor host nodes throughout a mesh network. Further, aggregation of sensor data by each mobile router can minimize data traffic for sensor data based on adding the aggregated sensor data within neighbor advertisement messages that are required for maintaining reachability within the tree-based wireless ad hoc mobile network, eliminating the necessity of continuous transport of data packets carrying sensor data from sensor host nodes throughout the tree-based wireless ad hoc mobile network.

Consequently, the mobile routers described in this copending application Ser. No. 11/862,845 can be used to implement the aggregating routers 24 of FIG. 1. Hence, the aggregating routers 24 can output an IP-based neighbor advertisement message 30 that includes the aggregated sensor data as described in the above-identified copending application Ser. No. 11/862,845, where the "clusterhead" is replaced with the nearest knowledge router 28 that receives the IP-based neighbor advertisement message 30 via the corresponding IP data link 26.

Hence, a scalable sensor network 12 can be implemented that utilizes data acquisition routers 20 for receiving sensor data from host sensor nodes 16 via various link layer protocols, and aggregating routers 24 that aggregate the sensor data into aggregated sensor data that can be supplied to a knowledge router 28 within the knowledge backbone network 14 in a scalable manner. A smaller scale implementation of the sensor network 12 also can be utilized, where a knowledge router 28 also can be configured for directly receiving sensor data via an IPv6 packet 32 transmitted by a sensor host node 16' attached to the knowledge router 28 via an attachment link 26'.

The knowledge backbone network 14 includes multiple IP-based knowledge routers 28 that can be configured for receiving aggregated sensor data from the received neighbor advertisement message 30 described in the above-identified copending application Ser. No. 11/862,845, and/or receiving sensor data from an IPv6 packet 32 received from an attached sensor host node 16'. As described below, the knowledge routers 28 can be configured to enable the knowledge backbone network 14 to supply desired sensor knowledge 64 to a sensor application 60, based on synchronization 84 of stored sensor information among the knowledge routers 64 according to a prescribed routing protocol (e.g., OSPF or IS-IS) or according to a layer 4 distribution protocol, and generating the sensor knowledge based on generating knowledge metadata describing evolution of the sensor information relative to a prescribed evolution domain. Hence, the knowledge backbone network 14 can be considered an "area" according to OSPF protocol, alternatively the knowledge routers 28 can be considered as Level 2 routers according to IS-IS protocol.

Figure 4:
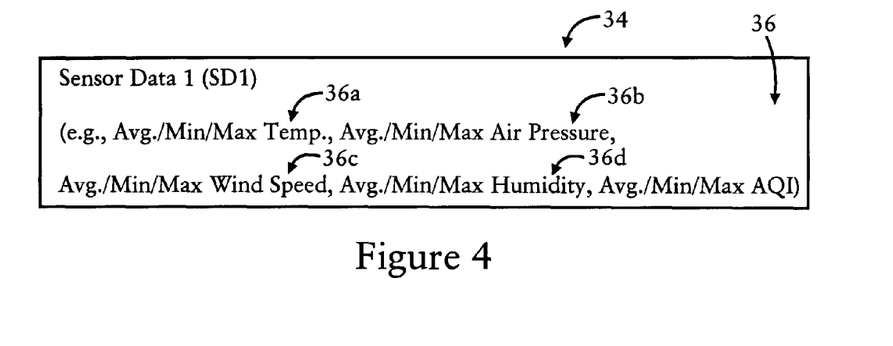
FIG. 4 illustrates an example of sensor data, received for example from an attached host sensor node or an IP router, according to an example embodiment.

As illustrated with respect to FIG. 4, the sensor data (illustrated as a sensor data element) 34 that can be contained within the neighbor advertisement message 30 or the IPv6 data packet 32 can include one or more data values 36 representing "raw sensor data", aggregated sensor data, or both. The term "sensor data" refers to data having originated from a physical sensor measuring a physical parameter, where the physical parameter is distinct from data link information that is required for establishment and maintenance of a data link. Hence, the term "sensor data" can refer to either "raw sensor data" generated by the physical sensor (e.g., a single temperature measurement value, a single air pressure measurement value, a single wind speed management value, a single humidity value, etc.), or an accumulation, aggregation, or statistical evaluation of raw sensor data. As illustrated in FIG. 4, the sensor data within the sensor data element 34 can include an aggregation 36 of values for multiple sensor types, including average, minimum, and maximum values each for a temperature aggregation 36a, an air pressure aggregation 36b, a wind speed aggregation 36c, a humidity aggregation 36, and an Air Quality Index (AQI) aggregation 36e. Sensor data related to other physical dimensions also can be included in the sensor data element 34, except that these physical dimensions must be distinct from existing data link parameters required for establishment and maintenance of a data link and otherwise utilized for existing routing protocols; hence, data link parameters such as the bit error rate, received signal strength indicator (RSSI), link speed (e.g., 10 Mbits/sec., 54 Mbit/sec, 100 Mbit/s) and network parameters for existing routing protocols (e.g., hop count, bandwidth utilization, etc.) are distinct from sensor data 34.

Figure 2:
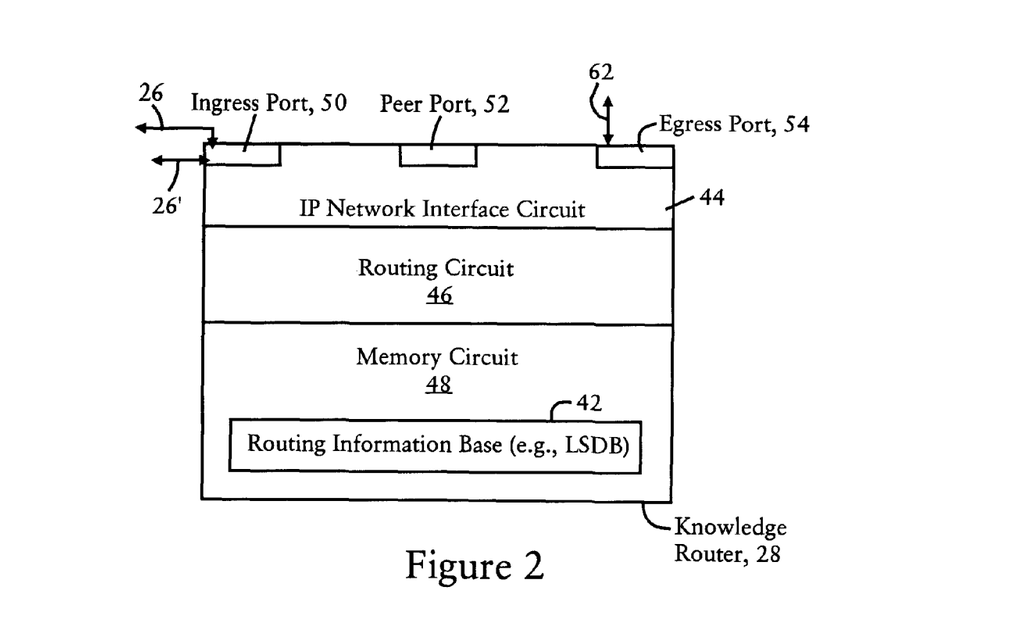
FIG. 2 illustrates an example IP knowledge router from the system of FIG. 1, according to an example embodiment.
Figure 5:
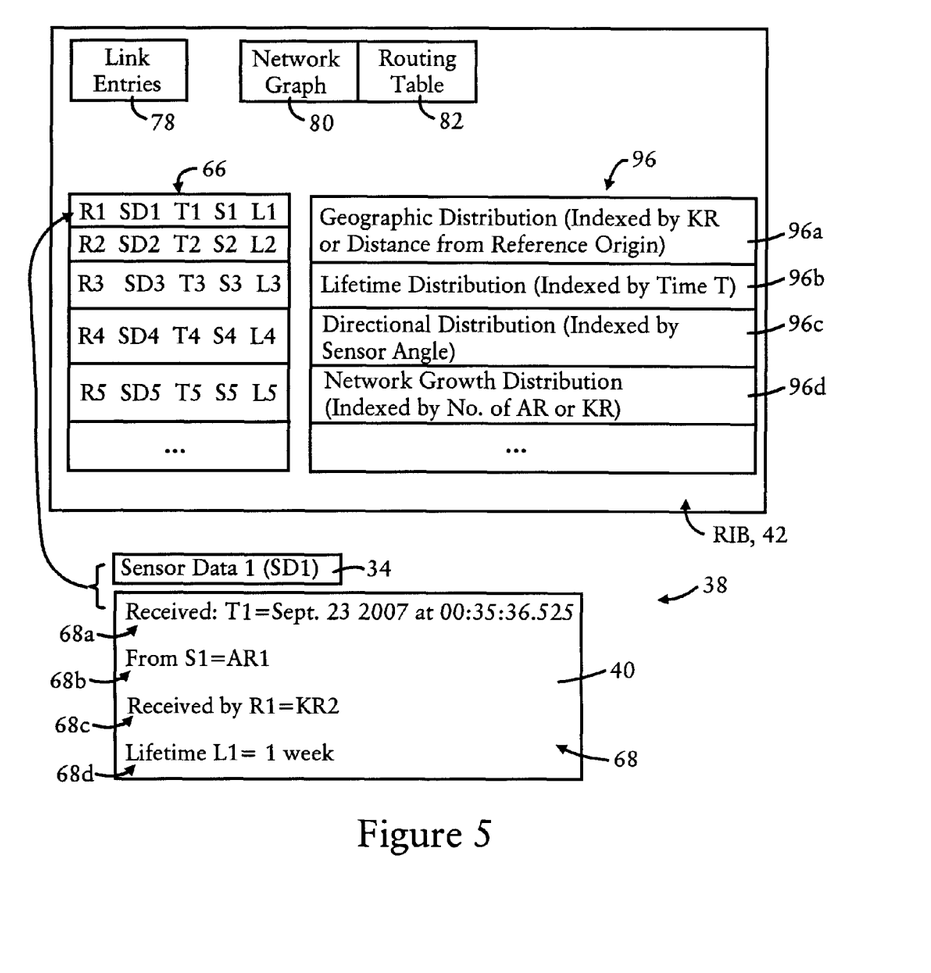
FIG. 5 illustrates example sensor information generated by the IP knowledge router of FIG. 3 and inserted into a routing information base, according to an example embodiment.

Any one of the knowledge routers 28 of FIGS. 1 and 2 can be configured for receiving sensor data in the form of "raw data" or accumulated data (e.g., the sensor data element 34) either from a received neighbor advertisement message 30 from an aggregating router 24, or from a received IPv6 data packet 32 from an attached sensor host node 16'. If preferred, any one of the knowledge routers 28 also can be configured for receiving sensor data from a data acquisition router 20. As illustrated in FIG. 5, each of the knowledge routers 28 also can be configured for generating sensor information 38 based on generating information metadata 40 describing reception of the corresponding sensor data 34 by the corresponding knowledge router 28, and storing the sensor information 38 (including the sensor data 34 and the corresponding information metadata 40) into its routing information base (RIB) 42.

FIG. 2 illustrates an example knowledge router 28 according to an example embodiment. The knowledge router 28 includes an IP network interface circuit 44, a routing circuit 46, and a memory circuit 48 configured for storing the routing information base 42 of FIG. 5, for example in the form of a link state database (LSDB) according to OSPF or IS-IS protocol. The IP network interface circuit 44 can include an ingress port 50 configured for receiving the sensor data 34 via the IP messages 30 and/or 32 via links 26 and/or 26'. The IP network interface circuit 44 also can include a peer port 52, and an egress port 54. The peer port 52 can be configured for communication among the peer knowledge routers 28 according to existing routing protocols that support synchronization of data stored in the respective routing information bases 42, such as OSPF or IS-IS protocol. The egress port 54 can be configured for receiving messages 56, 58 from a sensor application 60 executed by a network node that is reachable via a data connection 62: it will be apparent that the connection 62 between the network node executing the sensor application 60 can be implemented as a local link, or as a virtual link that enables the network node executing the sensor application 60 to be reachable by a wide area network, or a multi-hop data connection that traverses one or more networks such as the wide area network (e.g., the Internet).

The routing circuit 46 can be configured for generating the sensor information 38, illustrated in FIG. 5, based on generating the metadata 40 associated with the corresponding received sensor data 34, and storing the sensor information 38 into the routing information base 42 as a sensor information entry 66, described in further detail below.

Any of the disclosed circuits of the knowledge routers 28 (including the network interface circuit 44, the routing circuit 46, and the memory circuit 48, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown), where execution of executable code stored in an internal memory circuit (e.g., within the memory circuit 48) causes the processor circuit to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuit 48 can be implemented, for example, using a non-volatile memory such as a programmable read only memory (PROM) or an EPROM, and/or a volatile memory such as a DRAM, etc.

Further, any reference to "outputting a message" or "outputting a packet" can be implemented based on creating the message/packet in the form of a data structure and storing that data structure in a tangible memory medium in the disclosed apparatus (e.g., in a transmit buffer). Any reference to "outputting a message" or "outputting a packet" also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" can be implemented based on the disclosed apparatus detecting the electrical (or optical) transmission of the message/packet on the communications medium, and storing the detected transmission as a data structure in a tangible memory medium in the disclosed apparatus (e.g., in a receive buffer).

Also note that the memory circuit 48 can be implemented dynamically by the routing circuit 46, for example based on memory address assignment and partitioning executed by the routing circuit 46.

Figure 3:
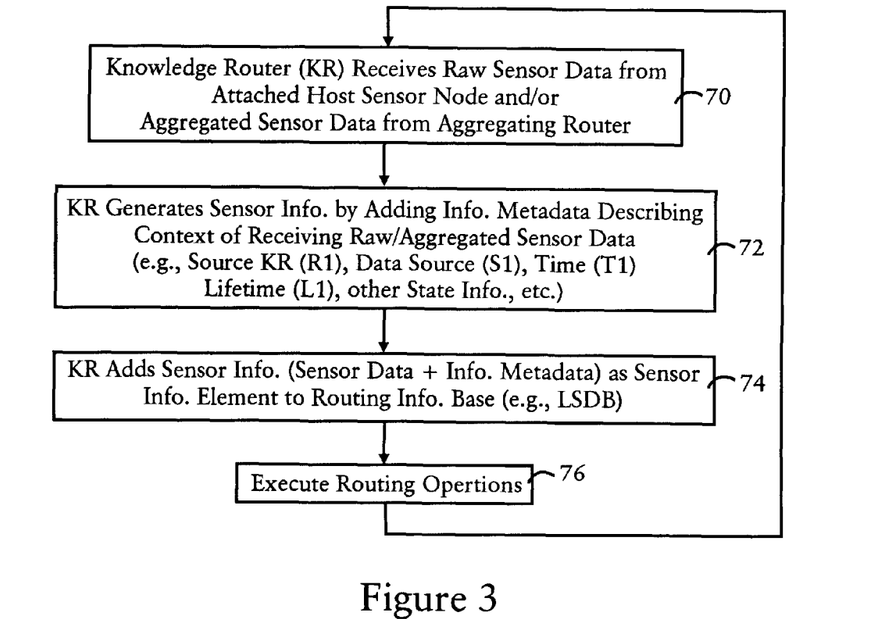
FIG. 3 illustrates an example method by one of the IP knowledge routers of FIGS. 1 and 2, according to an example embodiment.
Figure 6:
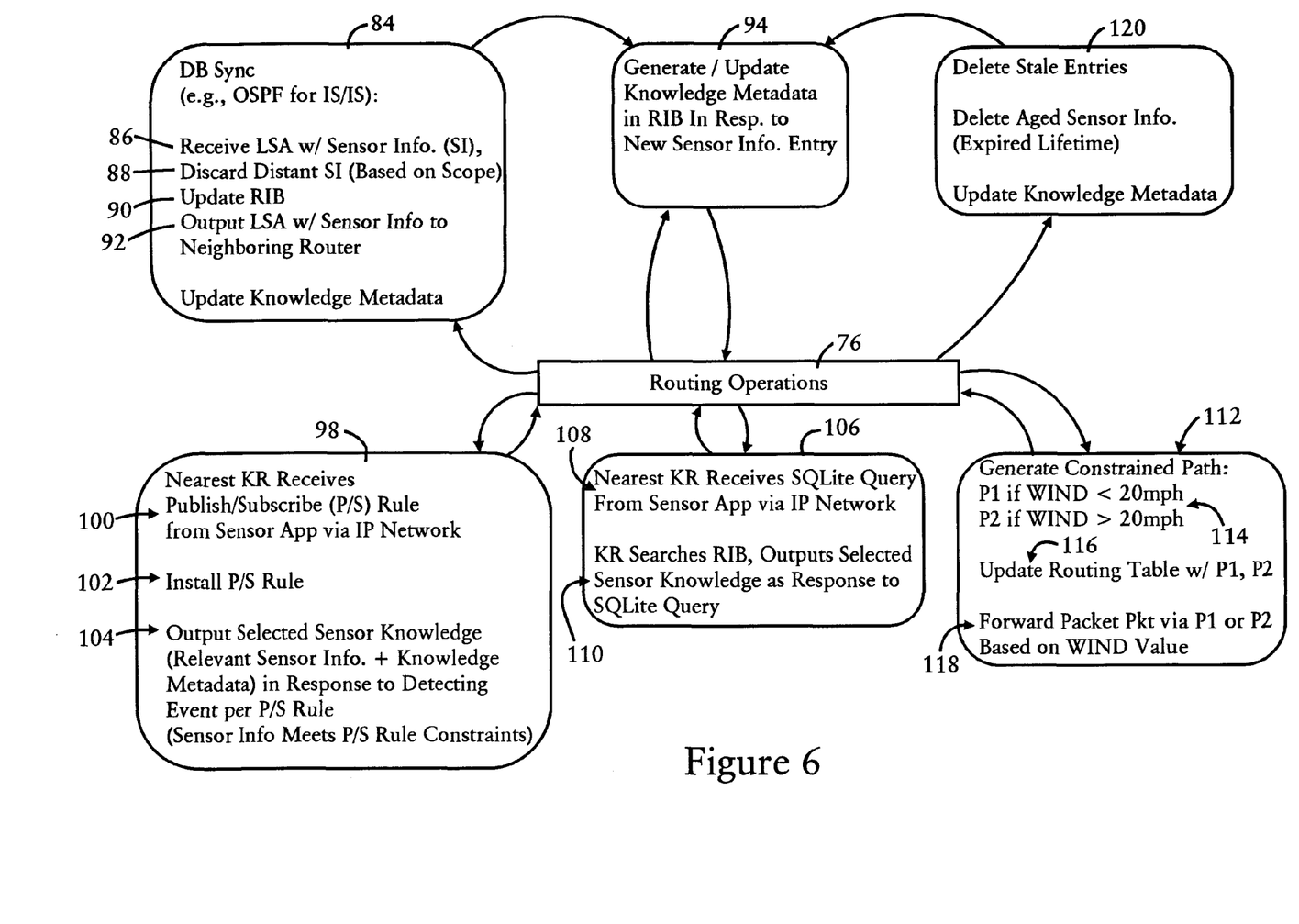
FIG. 6 illustrates example routing operations executed by the knowledge router of FIG. 2 based on the sensor information stored in the routing information base, according to an example embodiment.

FIG. 3 illustrates an example method by any one of the knowledge routers 28, according to an example embodiment. FIG. 6 illustrates example routing operations that can be executed by the routing circuit 46 of any one of the knowledge routers 28, according to an example embodiment. The steps described in FIGS. 3 and 6 can be implemented as executable code stored on a computer readable medium (e.g., floppy disk, hard disk, ROM, EEPROM, nonvolatile RAM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

As illustrated in FIG. 3, the ingress port 50 of a knowledge router 28 can receive in step 70 sensor data (e.g., raw sensor data and/or aggregated sensor data) 34, for example from an attached host sensor node 16' or an aggregating router 24. The routing circuit 46 can generate in step 72 sensor information 38 by generating information metadata 40 that describes the context of the received sensor data 34. As illustrated in FIG. 5, the information metadata 40 can include context information 68 describing the reception of the sensor data (e.g., "SD1") 34 by the corresponding knowledge router 28. For example, the context information 68 described by the information metadata 40 can include: a time value (e.g., "T1") 68a indicating the time that the corresponding sensor data element 34 was received by the corresponding knowledge router 28; an origin identifier (e.g., "S1") 68b that identifies the network node (e.g., Aggregating Router "AR1") having transmitted the sensor data 34 to the knowledge router 28; source information (e.g., "R1") 68c that identifies the knowledge router 28 having stored the corresponding received sensor data 34 in its corresponding routing information base; and a lifetime information (e.g., "L1") 68d identifying a lifetime of the corresponding sensor data ("SD1") 34. Hence, the time value 68a identifies the relative age of the sensor data ("SD1") 34, the origin identifier 68b identifies the network node having transmitted the sensor data ("SD1") 34 into the knowledge backbone network 14, the source information 68c identifies the original or "source" knowledge router 28 that sources the corresponding sensor data ("SD1") 34 into the knowledge backbone network 14, and the lifetime information 68d identifies the lifetime or life span of the corresponding sensor data ("SD1") 34.

Hence, the metadata 40 can specify attributes describing reception of the sensor data ("SD1") 34 by the knowledge router 28, enabling the context of the sensor data 34 to be preserved as the sensor data 34 is propagated through database synchronization 84 to other knowledge routers 28. As described previously, other attributes can be added to the information metadata 40 that describe the context of the received sensor data 34, for example an identifier of the source sensor network 12, a PAN identifier, an information service provider identifier (e.g., if sensor data is being provided by multiple service providers), or other relevant environmental or political information associated with reception of the sensor data 34 (e.g., declaration of a tropical storm warning, hurricane watch, hurricane warning, flood watch, flood warning, a declared disaster area due to weather events, etc.).

As illustrated in FIG. 3, the routing circuit 46 adds in step 74 the sensor information element 38 (including the corresponding sensor data 34 and the corresponding information metadata 40) as a sensor information entry 66 into the routing information base 42. As illustrated in FIG. 5, the sensor information entry 66 can be implemented in various forms, based on indexing preferences that may be implemented by the routing circuit 46. For example, FIG. 5 illustrates that the routing circuit 46 can index the sensor information entries based on source information (e.g., R1, R1, R3, ... ) 68c that identifies the source knowledge router 28 having injected the corresponding sensor information element 38 into the knowledge backbone network 14.

FIG. 5 also illustrates that the sensor information entries 66 are part of the routing information base 42 that also includes routing information such as link state entries 78 that are generated based on the routing circuit 46 sending and receiving "hello packets" and link state advertisement (LSA) messages, for example according to OSPFv3 protocol. As described previously, the sensor data is distinct from the link data, including link state data stored in the link state entries 78. The routing information base 42 also can be configured for storing a network graph 80 that is generated by the routing circuit 46 and represents a graph (e.g., network topology) of the knowledge backbone network 14. The routing information base 42 also can be configured for storing a routing table 82 specifying routing paths having been generated by the routing circuit 46 based on the network graph 80, the link state entries 70, and route optimization according to prescribed routing protocols and as described in further detail below.

Hence, the routing information base 42 can include all routing information that is used under existing routing protocols for establishing routes within the knowledge backbone network 14 based on synchronization of the link state entries 78 and the sensor information entries 66 among the knowledge routers 28 according to a prescribed routing protocol.

According to one example implementation, the routing information base 42 can be implemented based on storing the link state entries 78 in a first link state database that is synchronized among the knowledge routers 28 by a first OSPFv3 instance, and storing the sensor information entries 66 (and the knowledge metadata entries 96, as appropriate) in a data knowledge database (DKDB) distinct from the first link state database, where the DKDB can be synchronized among the knowledge routers 28 by a second OSPFv3 instance distinct from the first OSPFv3 instance. Hence, in this example implementation the routing circuit 46 can execute multiple OSPFv3 instances.

As described in further detail below with respect to FIG. 6, the routing circuit 46 can execute in step 76 of FIG. 3 various routing operations based on the sensor information 38 stored in the routing information base 42 in the form of sensor information entries 66.

FIG. 6 illustrates example routing operations 76 that can be performed by the routing circuit 46. As described previously, the sensor information entries 66 in the routing information base 42 can be considered as opaque data from the perspective of the prescribed routing protocols (e.g., OSPF for IS/IS) that execute database synchronization 84. Hence, the routing circuits 46 in each of the knowledge routers 28 can execute database synchronization 84 of their respective link state entries 78 and their sensor information entries 66, for example in response to the addition of at least one sensor information entry 66 in step 74. Hence, the database synchronization 84 enables the sensor information entries 66 containing the sensor information elements 38 to be propagated and synchronized among all the routing information bases 42 of the respective knowledge routers 28 in step 84 in the same manner that the link state entries 78 are synchronized among the routers 28 according to existing routing protocols.

Consequently, a routing circuit 46 receiving in step 86 a routing protocol message (e.g., a received link state advertisement (LSA) message or "hello message") specifying sensor information in the form of a sensor information element 38 or a sensor information entry 66 can determine in step 88 whether to save the received sensor information 38 or 66 based on the corresponding lifetime value 68d, or based on determining whether the sensor information specifies a source knowledge router from the source information 68c that exceeds a prescribed scope (e.g., if the sensor information is from a knowledge router 28 that exceeds a prescribed number of hops). If in step 88 the routing circuit 46 determines that the lifetime of the sensor information 38 or 66 has expired, or that the sensor information has exceeded its scope (based on exceeding the prescribed number of hops), the routing circuit 46 can selectively discard the undesired sensor information.

Assuming the routing circuit 46 determines in steps 86 and 88 that the received sensor information 38 or 66 includes relevant information within its lifetime and within the relevant scope, the routing circuit 46 can update in step 90 its routing information base 42 with a new sensor information entry 66, and continue the database synchronization 84 based on outputting in step 92 a link state advertisement message or "hello message" with its updated sensor entries 66 to a neighboring router, for example according to OSPFv3 protocol.

Following any change in the link state entries 78 or the sensor information entries 66 in its routing information base 42, the routing circuit 46 can update its network graph 80 and routing tables 82, and generate and/or update in step 94 knowledge metadata entries 96, illustrated in FIG. 5. As described previously, "knowledge metadata" describes the evolution of the sensor information entries 66 generated by the IP router and received from other routers via database synchronization 84. Each of the knowledge metadata entries 96 describes a corresponding evolution of the stored sensor information entries 66 as the sensor information entries 66 are accumulated over time: the "evolution" can refer to changes detected in the sensor information entries 66 relative to a prescribed evolution domain, where each "evolution domain" can identify at least one independent variable or dimension used to identify relevant changes in the sensor information. For example, the geographic distribution knowledge metadata 96a can represent an indexing of change in the sensor information entries 66 relative to a change in geographic distribution or distance from a reference origin, where sensor information can be evaluated with respect to geography or topography, or movement relative to a reference origin (e.g., measuring changes in sensor information by a mobile network as it moves further from a reference origin); the lifetime distribution knowledge metadata 96b can represent an indexing of change in the sensor information entries 66 over time, for example comparing short-term or long-term changes in the sensor information; the directional distribution knowledge metadata 96c can represent an indexing of change relative to a sensor angle, for example in the case of radar-based sensor information or navigation-based sensor information requiring an orientation relative to a prescribed coordinate system; the network growth distribution knowledge metadata 96d can represent evolution of the sensor information as the network grows, for example indexed by the number of aggregating routers 24 in the sensor network 12, or the number of knowledge routers 28 in the knowledge backbone network 14. Other examples of knowledge metadata can include indexing information for generating metric paths or gradients, for example isometric paths or maximum gradient paths to identify maximum or minimum changes in the distribution of values, for example in the case of maximum temperature gradient paths for a given geographic area.

Hence, the generation and storage by the routing circuit 46 of the knowledge metadata entries 96 enables the routing circuit 46 to generate "sensor knowledge" based on generating the knowledge metadata entries 96 in step 94, and storing the knowledge metadata entries 96 in the routing information base 42.

Consequently, the sensor knowledge represented by the knowledge metadata entries 96 overlying the sensor information entries 66 enables the routing circuit 46 to generate intelligent database responses 64 to the sensor application 60 of FIG. 1. For example, the routing circuit 46 can output in step 98 selected sensor knowledge 64 to the sensor application 60 in response to detecting a prescribed event. In particular, in response to the corresponding egress port 54 receiving in step 100 of FIG. 6 a Publish/Subscribe rule 58 from the sensor application 60, the routing circuit 46 can install in step 102 the Publish/Subscribe rule 58 to enable the routing circuit 46 to determine (e.g., for each update of the sensor information entries 66) in step 104 whether the sensor information 66 matches the Publish/Subscribe rule 58 relative to a relevant knowledge metadata entry 96. An example event detected in step 104 can be detecting a new record high temperature when the Air Quality Index (AQI) is determined to be in an unhealthy range. Hence, the routing circuit 46, in response to detecting in step 104 the prescribed event that is defined by the Publish/Subscribe rule 58 supplied by the sensor application 60, can output in step 104 the desired sensor knowledge 64 to the sensor application 60.

The routing circuit 46 also can be configured for utilizing the knowledge metadata 96 and/or the information metadata 40 in order to respond in step 106 to queries from the sensor application 60. As described previously, since all the sensor information entries 66 are synchronized among the routing information bases 42 of the knowledge routers 28, the knowledge backbone network 14 can serve as persistent storage of the sensor information 38 in the sensor information entries 66, enabling the sensor application 60 to send a query 56 to the nearest knowledge router 28.

The routing circuit 46 can be configured for responding to queries to accommodate the relative complexity of the query 56. For example, the query 56 can be a retrieval request for sensor information 38 (or entries 66) satisfying prescribed metadata criteria (e.g., sensor information added after a specified time or date, or sensor information added by a specified origin 68b or source knowledge router 68c). Additional database indexing can be applied to the stored sensor information 38 either by the routing circuit 46 (e.g., the knowledge metadata 96) or by an external database system and stored within the routing information base 42, enabling the persistent storage of the routing information base 42 distributed among the knowledge routers 28 to serve as a distributed database. Hence, the query 56 also can be an intelligent database query according to known database query protocols, enabling the routing circuit 42 to respond to intelligent database queries. Other indexing schemes overlying the sensor information entries 66 and/or the knowledge metadata entries 96 can be built by external applications (e.g., database applications) and stored in the routing information base 42 for use by the routing circuit 46 in responding to database queries 56.

The routing circuit 46 also can respond to queries for example based on publication of a prescribed set of Application Programming Interfaces (APIs) executed by the routing circuit 46. Hence, the APIs can be utilized by the sensor application 60 in generating queries or procedure calls to the API interface published by the knowledge router 28. The routing circuit 46 also can be configured for responding to Layer 4 distribution protocol queries. Consequently, the persistent stored sensor information, as well as the distributed database, enables the sensor information and/or distributed database to be presented as a front-end interface that can be shared between sensor applications and/or database applications, without the necessity of requesting the data from a database server.

Hence, in response to the egress port 54 receiving in step 108 a query (e.g., an intelligent database query) 56, the routing circuit 46 can respond to the query 56 by searching in step 110 its routing information base 42 using the appropriate information metadata 40 and/or knowledge metadata 96 (and other indexes added to the routing information base 42 by an external database application) in order to provide the desired sensor information 38 and/or sensor knowledge 64. Example sensor knowledge 64 can be identifying peak daily temperatures within the last week that exceeded a historical average temperature for the relevant month, with approximate locations of the peak temperatures identified by the attribute 68c identifying the source knowledge router 28.

Another example routing operation that can be performed by the routing circuit 46 includes executing constrained routing in step 112. For example, the routing circuit 46 can be configured for generating in step 114 a first path ("P1") for reaching a destination (e.g., sensor application 60) if selected sensor information (e.g., "WIND") is below a first threshold (e.g., 20 miles per hour (mph)) indicating a low wind condition, and a second path ("P2") for reaching the destination if the selected sensor information (e.g., "WIND") exceeds the first threshold (e.g., 20 mph) indicating a high wind condition. The routing circuit 46 can store in step 116 the constrained paths "P1" and "P2" in its routing table 82 for use in routing in step 118 a received packet based on selecting one of the paths P1 or P2 based on whether the relevant sensor information identifies that the corresponding detected sensor metric is below the threshold of 20 mph, or exceeds the threshold of 20 mph. In this example, use of a constrained routing path based on wind can be particularly beneficial for paths that can utilize laser transceivers for establishing a fiber-less laser link (i.e., over the air): such a laser link, however, can be unreliable in windy conditions due to movement of the laser transceivers, or weather conditions that reduce the propagation capabilities of the laser link, for example rain, snow, or fog. Hence, the constrained paths can enable use of the laser link (e.g., "P1") for high bandwidth transmissions during ideal weather conditions, reserving use of the alternate (lower throughput) path (e.g., "P2") during adverse weather conditions that are detected and based on the sensor information stored in the routing information base 42.

As described previously, another example routing operation executed by the routing circuit 46 can be deletion of a stale sensor information entry 66 in step 120 in response to detecting that the corresponding lifetime attribute 68d has expired. Deletion of the stale entry 66 can be followed by updating the knowledge metadata 96 in step 94, or performing a database sync operation in step 84, if preferred.

According to the example embodiments, routers can store received sensor data and associated metadata describing reception of the sensor data by the IP router, and synchronize routing information bases to enable the network to serve as a distributed database for sensor applications. Advanced database query operations can be executed by the routers on behalf of sensor applications based on the routers having established sensor knowledge based on generating knowledge metadata describing the evolution of the sensor information. The sensor information also can be distributed using existing routing protocols, based on supplying the sensor information as opaque data relative to the routing protocols. Storage of the sensor data and the associated information metadata in the routing information base also enables the routing circuit to generate knowledge metadata that can be used either for responding to database queries, or generating constrained routes that optimize routing of data packets based on sensor data that is distinct from existing network layer and link layer parameters.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
a first Internet Protocol (IP) router receiving sensor data within an IP network from at least one of a second IP router or an attached host sensor node, the sensor data distinct from link data of a network link;
the first IP router generating sensor information based on storing the sensor data with metadata describing reception of the sensor data by the first IP router in a routing information base, the routing information base further storing routing information required for the first IP router to establish one or more routes to provide reachability to a destination within the IP network; and the first IP router synchronizing the routing information base with the routing information base of at least one of the second IP router or a third IP router within the IP network according to an IP routing protocol to maintain reachability within the IP network, the synchronizing of the routing information base including synchronizing the sensor information stored in the routing information base, wherein the synchronizing further includes:

the first IP router receiving sensor information from the third IP router according to the IP routing protocol providing synchronization of the routing information base in the first IP router with a remote routing information base of the third IP router, the first IP router generating sensor knowledge based on generating metadata describing evolution of the sensor information generated by the first IP router, and the received sensor information from the third IP router, relative to a prescribed evolution domain, and storing the metadata describing the evolution in the routing information base.

2. The method of claim 1, further comprising generating a constrained routing path to the destination based on the sensor information and the routing information stored in the routing information base.

3. The method of claim 2, wherein the generating a constrained routing path includes:

generating a first path for reaching the destination if a first portion of the sensor information identifies a detected sensor metric is below a first threshold; and generating a second path for reaching the destination if the first portion of the sensor information identifies the detected sensor metric exceeds the first threshold, the second path distinct from the first path;

the method further comprising selecting, by the first IP router, one of the first or second paths for routing a received data packet, based on determining whether the first portion of the sensor information identifies the detected sensor metric is below the first threshold or exceeds the first threshold.

4. The method of claim 1, further comprising providing at least a portion of the sensor information to a sensor application in response to one of the first IP router receiving a database query from the sensor application, or the first IP router detecting a prescribed event defined by a prescribed rule related to the sensor information.

5. The method of claim 4, further comprising receiving by the first IP router the prescribed rule related to the sensor information from the sensor application via the IP network.

6. The method of claim 1, further comprising providing at least a portion of the sensor knowledge to a sensor application in response to one of the first IP router receiving a database query from the sensor application, or the first IP router detecting a prescribed event defined by a prescribed rule related to the sensor knowledge.

7. The method of claim 1, wherein the metadata includes at least one of source information identifying the first IP router having stored the received sensor data in the routing information base or lifetime information indicating a lifetime of an identified portion of the sensor data stored in the routing information base, the method further comprising:

selectively removing, by the first IP router, the identified portion of the sensor data from the routing information base in response to detecting an expiration of the corresponding lifetime;

receiving, by the first IP router, received sensor information from the third IP router according to the IP routing protocol providing synchronization of the routing information base with a remote routing information base of the third IP router, the received sensor information including first sensor information having been generated by the third IP router and second sensor information having been received by the third IP router from a fourth IP router according to the IP routing protocol; and selectively discarding, by the first IP router, the second sensor information based on identifying from corresponding source information that the second sensor information originated from a source beyond a prescribed scope utilized by the first IP router.

8. The method of claim 1, wherein:

the receiving includes receiving from the second IP router an IP advertisement message that specifies at least a portion of the sensor data;

the routing information base is implemented as a link state database that stores the sensor information including the sensor data and metadata, the synchronizing including the first IP router sending a link state advertisement message, specifying at least a portion of the sensor information, to a third IP router according to a prescribed link state routing protocol.

9. An apparatus comprising:

an Internet Protocol (IP) network interface circuit configured for receiving sensor data within an IP network from at least one of an IP advertisement message from a first IP router or an attached host sensor node, the sensor data distinct from link data of a network link;

a memory circuit configured for storing a routing information base, the routing information base storing routing information required for the apparatus to establish one or more routes to provide reachability to a destination within the IP network; and a routing circuit configured for generating sensor information based on storing, into the routing information base, the sensor data with metadata describing reception of the sensor data by the apparatus, the routing circuit configured for synchronizing the routing information base with the routing information base of at least one of the first IP router or a second IP router within the IP network according to an IP routing protocol to maintain reachability within the IP network, the synchronizing of the routing information base including synchronizing the sensor information stored in the routing information base, wherein the routing circuit is configured for:

receiving received sensor information from the second IP router according to the IP routing protocol providing synchronization of the routing information base with a remote routing information base of the second IP router, and generating sensor knowledge based on generating metadata describing evolution of the sensor information generated by the routing circuit, and the received sensor information from the second IP router, relative to a prescribed evolution domain, the routing circuit configured for storing the metadata describing the evolution in the routing information base.

10. The apparatus of claim 9, wherein the routing circuit is configured for generating a constrained routing path to the destination based on the sensor information and the routing information stored in the routing information base.

11. The apparatus of claim 10, wherein the routing circuit is configured for generating the constrained routing path based on:

generating a first path for reaching the destination if a first portion of the sensor information identifies a detected sensor metric is below a first threshold; and generating a second path for reaching the destination if the first portion of the sensor information identifies the detected sensor metric exceeds the first threshold, the second path distinct from the first path;

the routing circuit further configured for selecting one of the first or second paths for routing a received data packet, based on determining whether the first portion of the sensor information identifies the detected sensor metric is below the first threshold or exceeds the first threshold.

12. The apparatus of claim 9, wherein the routing circuit is configured for providing at least a portion of the sensor information to a sensor application in response to one of the network interface circuit receiving a database query from the sensor application, or the routing circuit detecting a prescribed event defined by a prescribed rule related to the sensor information.

13. The apparatus of claim 12, wherein:
the IP network interface circuit is configured for receiving the prescribed rule related to the sensor information from the sensor application via the IP network;
the routing circuit configured for implementing the prescribed rule for detection of the prescribed event relative to the sensor information.

14. The apparatus of claim 9, wherein the routing circuit is configured for providing at least a portion of the sensor knowledge to a sensor application in response to one of the IP network interface circuit receiving a database query from the sensor application, or the routing circuit detecting a prescribed event defined by a prescribed rule related to the sensor knowledge.

15. The apparatus of claim 9, wherein the metadata includes at least one of source information identifying the apparatus having stored the received sensor data in the routing information base or lifetime information indicating a lifetime of an identified portion of the sensor data stored in the routing information base, wherein:
the routing circuit is configured for selectively removing the identified portion of the sensor data from the routing information base in response to detecting an expiration of the corresponding lifetime;
the IP network interface circuit is configured for receiving received sensor information from the second IP router according to the IP routing protocol providing synchronization of the routing information base with a remote routing information base of the second IP router, the received sensor information including first sensor information having been generated by the second IP router and second sensor information having been received by the second IP router from a third IP router according to the IP routing protocol;
the routing circuit is configured for selectively discarding the second sensor information based on identifying from corresponding source information that the second sensor information originated from a source beyond a prescribed scope utilized by the apparatus.

16. The apparatus of claim 9, wherein the routing information base is implemented as a link state database that stores the sensor information including the sensor data and metadata, the routing circuit configured for synchronizing the routing information base based on sending a link state advertisement message, specifying at least a portion of the sensor information, to the second IP router according to a prescribed link state routing protocol.

* * * * *